United States Patent
Zeniya et al.

(10) Patent No.: US 10,472,698 B2
(45) Date of Patent: Nov. 12, 2019

(54) METHOD OF PRODUCTION OF BRAZED JOINT AND SUCH A BRAZED JOINT

(71) Applicant: NIPPON STEEL & SUMITOMO METAL CORPORATION, Tokyo (JP)

(72) Inventors: Tasuku Zeniya, Tokyo (JP); Hitomi Nishibata, Tokyo (JP); Masanori Yasuyama, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 340 days.

(21) Appl. No.: 15/516,539

(22) PCT Filed: Oct. 2, 2015

(86) PCT No.: PCT/JP2015/078088
§ 371 (c)(1),
(2) Date: Apr. 3, 2017

(87) PCT Pub. No.: WO2016/052738
PCT Pub. Date: Apr. 7, 2016

(65) Prior Publication Data
US 2017/0298470 A1    Oct. 19, 2017

(30) Foreign Application Priority Data
Oct. 3, 2014    (JP) .................................. 2014-205089

(51) Int. Cl.
*C21D 9/50* (2006.01)
*B21D 22/20* (2006.01)
(Continued)

(52) U.S. Cl.
CPC ........... *C21D 9/505* (2013.01); *B21D 22/022* (2013.01); *B21D 22/20* (2013.01); *B23K 1/19* (2013.01);
(Continued)

(58) Field of Classification Search
CPC . C21D 9/00; C21D 9/50; C21D 9/505; C21D 1/18; F16B 5/08; B21D 22/022;
(Continued)

(56) References Cited

U.S. PATENT DOCUMENTS
2002/0069506 A1    6/2002   Brodt et al.

FOREIGN PATENT DOCUMENTS
JP    2002-178069 A    6/2002
JP    2004-141913 A    5/2004
(Continued)

OTHER PUBLICATIONS

Choquet et al., "Mathematical Model for Prediction of Austenite and Ferrite Microstructures in Hot Rolling Processes," IRSID Report, St. Germain-en-Laye, 1985, pp. 1025-1030.
(Continued)

*Primary Examiner* — Matthieu F Setliff
(74) *Attorney, Agent, or Firm* — Birch, Stewart, Kolasch & Birch, LLP

(57) ABSTRACT

A brazed joint having excellent tensile strength (TSS and CTS) and a method of production of the same are provided. A sheet combination 200 comprised of steel sheets 210, 220 between which a brazing filler metal 230 is clamped is heated at a temperature of the Ac3 point of the steel sheet (matrix material) or more. The Ar3 point of the regions near the brazing filler metal at the steel sheets is made higher than the Ar3 point of the steel sheets (matrix material), then the quenching start temperature X is made a temperature of the Ar3 point of the steel sheet (matrix material) or less and hot stamping is performed to produce a brazed joint.

13 Claims, 7 Drawing Sheets

(51) Int. Cl.
*B23K 1/19* (2006.01)
*C21D 9/00* (2006.01)
*C21D 1/18* (2006.01)
*C22C 9/02* (2006.01)
*B21D 22/02* (2006.01)
*F16B 5/08* (2006.01)
*B23K 103/04* (2006.01)
*B23K 103/16* (2006.01)
*B23K 35/28* (2006.01)
*B23K 35/30* (2006.01)

(52) U.S. Cl.
CPC .......... *C21D 1/18* (2013.01); *C21D 9/00* (2013.01); *C21D 9/50* (2013.01); *C22C 9/02* (2013.01); *F16B 5/08* (2013.01); *B23K 35/28* (2013.01); *B23K 35/30* (2013.01); *B23K 2103/04* (2018.08); *B23K 2103/166* (2018.08)

(58) Field of Classification Search
CPC .. B21D 22/20; C22C 9/02; B23K 1/19; B23K 2103/04; B23K 2103/166; B23K 35/30; B23K 35/28
See application file for complete search history.

(56) References Cited

FOREIGN PATENT DOCUMENTS

| | | |
|---|---|---|
| JP | 2011-88484 A | 5/2011 |
| JP | 2014-200840 A | 10/2014 |
| JP | 2015-166099 A | 9/2015 |

OTHER PUBLICATIONS

Kunitake, "Prediction of $Ac_1$, $Ac_3$ and Ms Temperatures of Steel by Empirical Formulas," Heat Treatment, vol. 41, No. 3, Jun. 2000, p. 164-169 (7 pages total), with a brief explanation and abstract in English.

(a)

(b)

METHOD OF PRODUCTION OF BRAZED JOINT AND SUCH A BRAZED JOINT

TECHNICAL FIELD

The present invention relates to a method of production of a brazed joint and to such a brazed joint, in particular is suitable for use for brazing together the sheet surfaces of a plurality of steel sheets.

BACKGROUND ART

In the past, the practice had been to produce a hot stamped part by a hot stamping process. At that time, a blank comprised of a plurality of steel sheets joined at the surfaces is supplied to the hot stamping process. Due to this, the strength and rigidity of the hot stamped part are raised. In this case, one or more steel sheets are joined at a region of the main steel sheet requiring larger strength and rigidity than other regions. As applications for such hot stamped parts using such blanks, for example, there are component parts of monocoque bodies (unit construction bodies) such as front side members or center pillars etc.

To join such a main steel sheet and a reinforcing steel sheet, there is the technique of using brazing.

PLT 1 discloses the art of placing a brazing filler metal (hard solder, same below) between the surfaces of the main steel sheet and reinforcing steel sheet and welding them to provisionally fasten the steel sheets and brazing filler metal, then heating the steel sheets to a temperature higher than the shaping temperature of the steel sheets and hot pressforming them and then cooling the steel sheets in the die after shaping so as to cause the brazing filler metal to solidify.

PLT 2 discloses the art of clamping a brazing filler metal with a solidus temperature of 1050° C. or less and a liquidus temperature of 700° C. or more between the surfaces of a main steel sheet and reinforcing steel sheet, placing the blank in a heating furnace to heat it to 900° C. to 1050° C., then quenching and press-forming (hot stamping) it.

PLT 3 discloses the art of coating a sheet surface with a brazing filler metal, heating the coated main steel sheet for the quenching and making the brazing filler metal melt, joining the surface of the main steel sheet and the surface of the reinforcing steel sheet through this melted brazing filler metal, then quenching and press-forming (hot stamping) the same.

CITATION LIST

Patent Literature

PLT 1: Japanese Patent Publication No. 2002-178069A
PLT 2: Japanese Patent Publication No. 2004-141913A
PLT 3: Japanese Patent Publication No. 2011-88484A
PLT 4: Japanese Patent Publication No. 2014-200840A
PLT 5: Japanese Patent Publication No. 2015-166099A

Nonpatent Literature

NPLT 1: Takedachi, A. "Prediction of Ac1, Ac3, and Ms Transformation Points of Steel by Empirical Formula", Heat Treatment, 41 (3), p. 164 to p. 169 NPLT 2: Choquet, P. et al., Mathematical Model for Predictions of Austenite and Ferrite Microstructures in Hot Rolling Processes, IRSID Report, St.Germain-en-Laye, 1985.7p.

SUMMARY OF INVENTION

Technical Problem

However, in the arts described in PLTs 1 to 3, locations arise where the brazing filler metal is not filled between the steel sheets. Clearances are liable to remain between the steel sheets. Therefore, in the arts described in PLTs 1 to 3, it is not easy to sufficiently improve the strength and rigidity of hot stamped parts.

Therefore, the inventors proposed in PLT 4 the technique of applying pressure in the thickness direction to a plurality of metal sheets between which a brazing filler metal is clamped at the time of the heating step for hot stamping or in the period from the heating step until transfer to the hot stamping step. According to this technique, it is possible to prevent clearance from remaining between the steel sheets as in the arts described in PLTs 1 to 3.

Further, the inventors proposed in PLT 5 using a brazing filler metal having a solidus temperature above the heating temperature and below the solidus temperature of the metal sheets in the hot stamping step so as to produce a hot stamped part having a strength and rigidity substantially equal to a hot stamped part described in the above-mentioned PLT 4 without making great changes to the hot stamping process.

On the other hand, for example, in auto parts etc. where both lighter weight and higher strength are being sought, further higher strength is being demanded for application of hot stamped parts (brazed joints) obtained by brazing together a plurality of steel sheets and hot stamping them.

However, the specific tensile shear strength (TSS) and cross tension strength (CTS) of the brazed joint described in PLTs 1 to 3 are not described, so the strength of the brazed joint was not sufficiently raised. Control (management) of the temperature of the steel sheets in the hot stamping step has not been studied from the viewpoint of raising the joint strength of a brazed joint.

Therefore, the present invention has as its object the provision of a brazed joint having excellent tensile strengths (TSS and CTS) and a method of production of the same.

Solution to Problem

To solve the above problem, the inventors took note of and studied the control (management) of the temperature of steel sheets in the hot stamping step. As a result, they discovered that the Ar3 point in a region near the brazing filler metal at the steel sheets becomes higher than the inherent Ar3 point of the steel sheets. Further, they discovered that by controlling the quenching start temperature in the hot stamping step to the inherent Ar3 point of the steel sheets or less, it is possible to make the degree of quenching at the region near the brazing filler metal of the steel sheets and the degree of quenching at other regions different to form a softened region in the region near the brazing filler metal of the steel sheets and thereby raise the tensile strength of the brazed joint and thereby completed the present invention.

The aspects of the present invention are as follows:
(1) A method of production of a brazed joint comprising a heating step of heating a sheet combination having a plurality of steel sheets superposed so that the sheet surfaces face each other and a first brazing filler metal placed in a predetermined region between the surfaces of two mutually adjoining steel sheets among the plurality of steel sheets by a heating temperature of an Ac3 point of the steel sheets or more and a hot stamping step of quenching and shaping the sheet combination heated by the heating step, wherein the first brazing filler metal has a liquidus temperature of less than the heating temperature, before the start of quenching in the hot stamping step, the Ar3 point in a region near the brazing filler metal at the steel sheets is higher than the Ar3 point of the steel sheets, and the quenching start temperature of the sheet combination at the hot stamping step is made a temperature of the Ar3 point of the steel sheet or less.

(2) The method of production of a brazed joint according to (1), further comprising a step of obtaining a sheet combination where instead of the first brazing filler metal, a second brazing filler metal having a solidus temperature over the heating temperature in the heating step and less than the solidus temperature of the steel sheets is placed in a predetermined region between two steel sheets and a brazing step of heating the sheet combination to a temperature over a liquidus temperature of the second brazing filler metal and less than the solidus temperature of the steel sheets before the heating step, then cooling down to less than the solidus temperature of the second brazing filler metal to braze the steel sheets.

(3) The method of production of a brazed joint according to (1) or (2), wherein the heating step heats the sheet combination while applying pressure to the sheet combination in the thickness direction of the steel sheets.

(4) The method of production of a brazed joint according to (2), wherein the brazing step heats the sheet combination while applying pressure to the sheet combination in the thickness direction of the steel sheets.

(5) The method of production of a brazed joint according to any one of (1) to (4), wherein the plurality of steel sheets are comprised of one or both of nonplated steel sheets not plated on their surfaces and galvanized steel sheets or aluminum plated steel sheets.

(6) A brazed joint comprising a plurality of steel sheets overlaid so that their surfaces face each other and a brazing filler metal placed in a predetermined region between the surfaces of two mutually adjoining steel sheets in the plurality of steel sheets, the two steel sheets being joined by the brazing filler metal, in which brazed joint, a relationship between an average hardness of positions near the brazing filler metal in the steel sheets contacting the brazing filler metal and an average hardness of representative positions of a base metal region in the steel sheets satisfies the following (A):

$$\text{Average hardness of positions near brazing filler metal (HV)} + 50 \text{ HV} < \text{average hardness of representative positions of base metal region (HV)} \quad (A)$$

where, in (A), the positions near the brazing filler metal are positions separated by exactly 10 μm from the positions of interfaces between the two steel sheets contacting the brazing filler metal and the brazing filler metal to the steel sheet sides along the direction of thickness of the steel sheets, the representative positions of the base metal region are positions at the two steel sheets contacting the brazing filler metal and separated by lengths of exactly ¼ of the thicknesses of the steel sheets from the surfaces of sides of the steel sheets not contacting the brazing filler metal in the two surfaces of the sheets to the steel sheet sides along the direction of thickness of the steel sheets, the average hardness of positions near the brazing filler metal is an arithmetic average of Vicker's hardnesses at three positions near the brazing filler metal, the average hardness of representative positions of the base metal region is an arithmetic average of Vicker's hardnesses at representative positions of the base metal region, and the intervals of the three locations have lengths of 3 times the arithmetic average of the lengths of two diagonals of an indentation first formed for measurement of the Vicker's hardnesses.

(7) The brazed joint according to (6) wherein a thickness of a softened region of a region of the steel sheets contacting the brazing filler metal and satisfying the following (B) is 10 μm or more:

$$\text{Hardness of the softened region (HV)} + 50 \text{ HV} < \text{Average hardness of representative positions of the base metal region (HV)} \quad (B)$$

where in (B), a hardness of the softened region is a Vicker's hardness at the softened region.

(8) The brazed joint according to (6) or (7) wherein the plurality of steel sheets are comprised of one or both of nonplated steel sheets not plated on their surfaces and galvanized steel sheets or aluminum plated steel sheets.

Advantageous Effects of Invention

According to the present invention, in the heating step, the Ar3 point at a region near the brazing filler metal at the steel sheets becomes higher than the inherent Ar3 point of the steel sheets. Further, the quenching start temperature of the sheet combination at the hot stamping step is made the temperature of the Ar3 point of the steel sheets or less. As a result, it is possible to make the degree of quenching at the region near the brazing filler metal of the steel sheets and the degree of quenching at the other regions different to lower the hardness of the region near the brazing filler metal of the steel sheets from the other regions. By the region near the brazing filler metal softening, it is possible to ease the stress concentration at the brazing filler metal. Accordingly, it is possible to control the temperature of the steel sheets in the hot stamping step to thereby raise the joint strength of the brazed joint.

DESCRIPTION OF EMBODIMENTS

Below, an embodiment of the present invention will be explained with reference to the drawings.

In the present embodiment, the explanation will be given with reference to the example of a case of producing a formed part used for a front side member or center pillar of an automobile. However, the formed part is not limited to these.

General Shape of Formed Part

Figure 1:
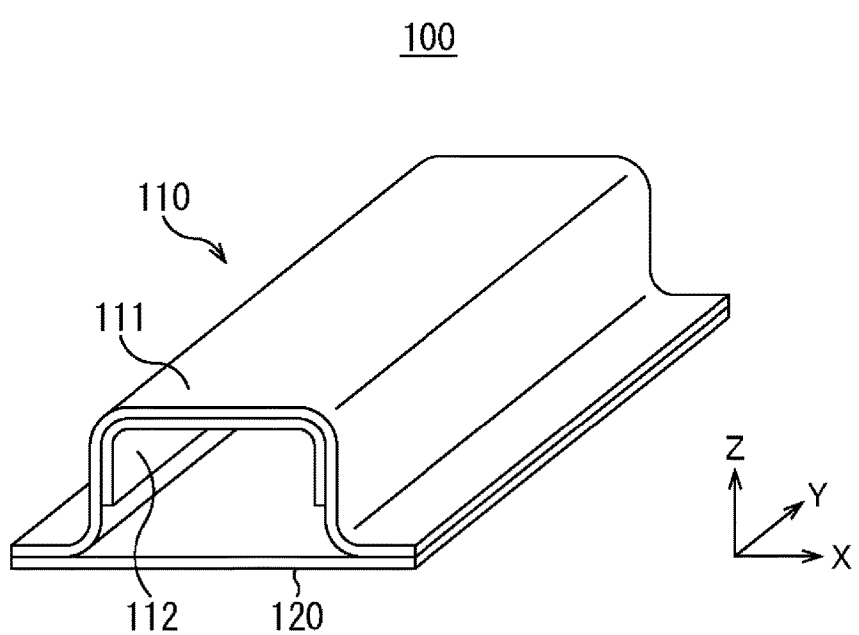
FIG. 1 is a view showing one example of the appearance configuration of a formed part.

First, one example of a formed part of the present embodiment will be explained. FIG. 1 is a view showing one example of the outside configuration of a formed part 100. Further, the X-Y-Z coordinates shown in the figures show the relationship in the directions in the figures. The origins of the coordinates are the same in the figures. In FIG. 1, the formed part 100 has a hat shaped member 110 and a closing plate 120.

The hat shaped member 110 is one example of a hot stamped part and has a main member 111 and a reinforcing member 112. The main member 111 and the reinforcing member 112 are respectively comprised of single steel sheets.

The horizontal cross-section of the main member 111 is trapezoidal in shape. The horizontal cross-section of the reinforcing member 112 is a U-shape matching the shape and size of the inside surface of the projecting part of the main member 111. The outside surface of the reinforcing member 112 and the inside surface of the projecting part of the main member 111 are joined by brazing. Due to this, the region of the main member 111 including the ridgelines of the inside surface of the projecting part is covered by the reinforcing member 112. Further, details of the brazing will be explained later.

The closing plate 120 is made from a single steel sheet (flat plate). The bottom surface of the flange part of the main member 111 and the top surface of the closing plate 120 are joined by spot welding or other welding.

The thicknesses of the main member 111, reinforcing member 112, and closing plate 120 may be the same or may be different.

Process of Production and Brazed Joint

Next, the process of production of a formed part and one example of a brazed joint forming part of a formed part will be explained. In the present embodiment, the process of production of the formed part includes a sheet combination preparing step, a sheet combination producing step, a heating step, a hot stamping step, and a shot blasting step. The order of the steps is the sheet combination preparing step, the sheet combination producing step, the heating step, hot stamping step, and shot blasting step.

Sheet Combination Preparing Step

Figure 2:
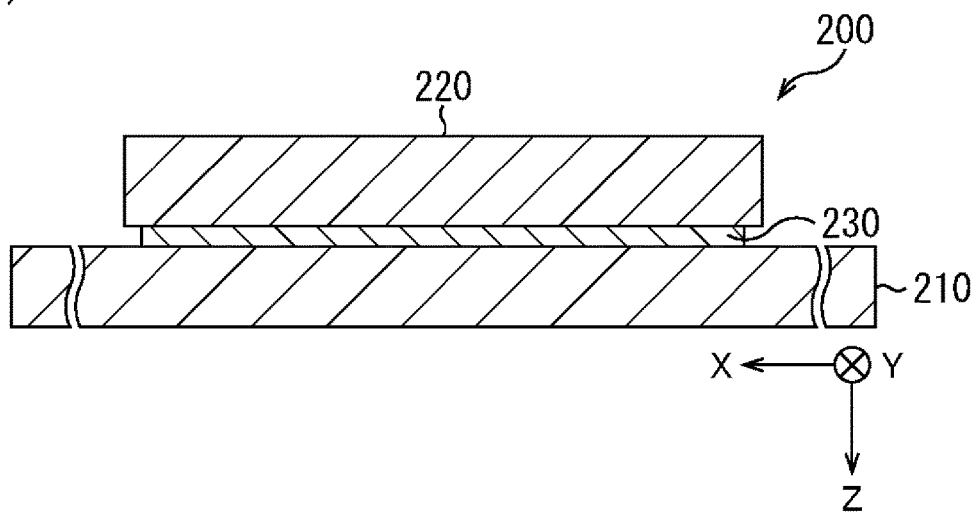
FIGS. 2A and 2B are views showing one example of the configuration of a sheet combination.
Figure 2:
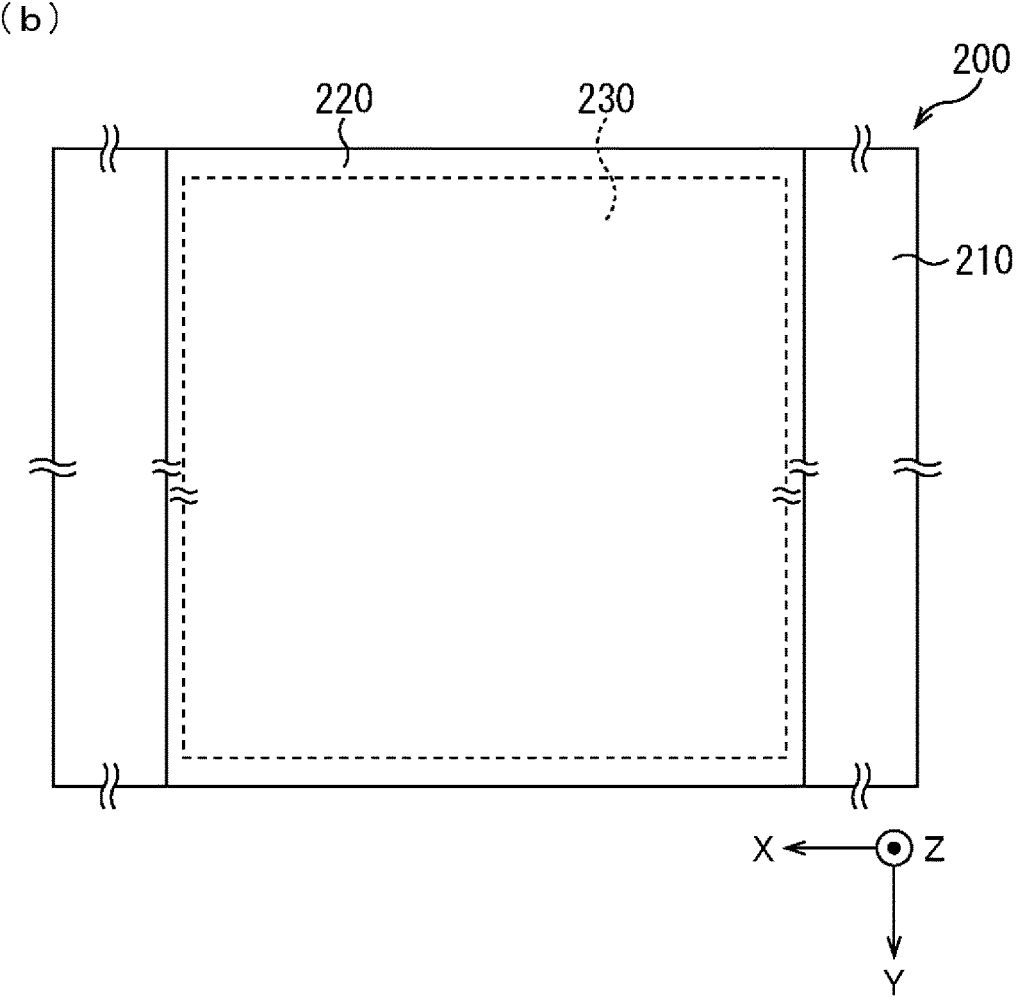

The sheet combination preparing step is a step of preparing the materials forming the sheet combination 200 shown in FIGS. 2A and 2B (steel sheets 210, 220 and brazing filler metal 230).

Configuration of Sheet Combination 200

FIGS. 2A and 2B are views showing one example of the configuration of the sheet combination 200. Specifically, FIG. 2A is a view showing a horizontal cross-section of the sheet combination 200. FIG. 2B is a view showing a region in which the brazing filler metal 230 is placed and is a view of the sheet combination from above the steel sheet 220. In FIG. 2B, the region in which the brazing filler metal 230 is placed is shown by broken lines (by transparency).

In FIGS. 2A and 2B, the sheet combination 200 has steel sheets 210, 220 and a brazing filler metal 230. The steel sheet 210 becomes the main member 111, while the steel sheet 220 becomes the reinforcing member 112. The brazing filler metal 230 is placed between the surfaces of the steel sheets 210, 220. As shown in FIG. 2B, the brazing filler metal 230 is placed in a predetermined region of the region of the surface of the steel sheet 220 not including the edge parts of the surface. Further, the brazing filler metal 230 may be placed over the entire surface of the steel sheet 220.

Configuration of Steel Sheets 210, 220

The steel sheets 210, 220 are not particularly limited in thickness. The steel sheets 210, 220 are not particularly limited in material either. Carbon steel, alloy steel, stainless steel, etc. may be illustrated. In the formed part 100 produced by the present embodiment, high strength and high rigidity are demanded. Therefore, the steel sheets 210, 220 are for example high strength steel sheets. They are preferably designed in chemical composition etc. so that the strength and rigidity demanded from the formed part are obtained. In the hot stamping step, the sheets are quenched during shaping (in the die). Therefore, the steel sheets 210, 220 preferably have high quenchabilities. That is, the steel sheets 210, 220 preferably contain elements raising the strength and rigidity and the quenchabilities. In particular, they preferably contain carbon and manganese to enable reliable formation of the later explained softened regions.

Further, as the steel sheets 210, 220, steel sheets not plated on their surfaces (nonplated steel sheets) may be used. However, the steel sheets 210, 220 may also be steel sheets galvanized or aluminum plated on their surfaces (galvanized steel sheets or aluminum plated steel sheets). Such galvanized steel sheets may be unalloyed galvanized sheets (for example, not alloyed hot dip galvanized steel sheets (GI)) or galvannealed sheets (for example, hot dip galvannealed steel sheets (GA)). Further, nonplated steel sheets and galvanized steel sheets or aluminum plated steel sheets may be combined.

Further, the closing plate 120 is not brazed. Therefore, the closing plate 120 may be made of any steel sheet. A plated steel sheet may be used to form the closing plate 120 or a nonplated steel sheet may be used to form the closing plate 120.

Configuration of Brazing Filler Metal 230

The brazing filler metal 230 is a known brazing filler metal. As the brazing filler metal 230, for example, a Cu—Sn-based, Cu—Zn-based, Ag—Cu-based, Ni—P-based, Ni—Cr—P-based, and Al—Si-based brazing filler metal can be employed. The brazing filler metal 230 may be a powder in form, may be a paste in form, or may be a solid.

In the following explanation, in the brazing filler metal 230, a first brazing filler metal 231 having a liquidus temperature of the brazing filler metal of less than the heating temperature of the heating step is used. The first brazing filler metal 231 is one example of the brazing filler metal 230. In the following explanation and drawings, unless otherwise indicated, the term "brazing filler metal 230" may be read as "brazing filler metal 231".

In the heating step, the brazing filler metal 231 is heated. If the heating temperature exceeds the liquidus temperature of the brazing filler metal, the metal will melt and then be cooled. When becoming less than the solidus temperature of the brazing filler metal, it will become a solid phase and the steel sheets will be joined together thereby ending the brazing operation.

The brazing filler metal 231 may become the solid phase during the heating step or during the hot stamping step. Therefore, at the point of start of the shaping by the cooling die in the hot stamping step, it may be in any state of a coexisting solid-liquid state, liquid phase, or solid phase, but becoming a solid phase in state is preferable. If the brazing filler metal 231 is a solid phase in state at the time of starting shaping by the cooling die in the hot stamping step, it is possible to reliably prevent liquid metal embrittlement cracking.

On the other hand, the heating temperature at the heating step is usually 800° C. to 1000° C. It may also become 1200°

C. At such a heating temperature, the brazing filler metal 231 is a liquid phase in state, but it may also be in a coexisting solid and liquid state.

Therefore, the first brazing filler metal 231 (liquidus temperature) is preferably selected so that the brazing of the steel sheets 210, 220 is suitably performed at the heating step and the brazing is completed before the end of the hot stamping step.

From the above viewpoint, the solidus temperature of the brazing filler metal 231 is preferably 700° C. or more. 750° C. or more is more preferable. Further, the liquidus temperature of the brazing filler metal 231 is preferably 800° C. or more, while 850° C. or more is more preferable.

Process of Production of Sheet Combination

When producing the sheet combination 200, first, the steel sheets 210, 220 are overlaid at their surfaces through the brazing filler metal 231 so that the brazing filler metal 231 is placed at a predetermined region of the region of the surface of the steel sheet 220 other than the edge parts of the surface. At this time, the steel sheets 210, 220 are positioned so that the desired positional relationship between the main member 111 and the reinforcing member 112 is obtained and becomes a position suitable for brazing.

When using a paste-like brazing filler metal 231, for example, the brazing filler metal 231 is coated on the above-mentioned region of the surface of the steel sheet 220 (region excluding edges), then the surface of the steel sheet 220 (surface on which brazing filler metal 231 is coated) and the surface of the steel sheet 210 are positioned in the above way and overlaid.

On the other hand, when using a powder or solid brazing filler metal 231, for example, the above-mentioned positioning is performed so that the brazing filler metal 231 is placed in the above-mentioned region between the surfaces of the steel sheets 210, 220 (region excluding edges), then the surfaces of the steel sheets 210, 220 are overlaid so as to sandwich the brazing filler metal 231 between them.

Here, the thickness of the brazing filler metal 231 is not particularly limited. For example, from the viewpoint of being able to ensure the steel sheets 210, 220 are joined, the thickness of the brazing filler metal 231 may be made 30 μm to 200 μm.

Further, the steel sheets 210, 220 may be overlaid while sandwiching the brazing filler metal 231 between them, then the steel sheets 210, 220 welded. The welding is typically spot welding, but may also be laser beam welding, TIG welding, seam welding, etc. By doing this, the positions of the steel sheets 210, 220 with each other can be fixed and the contact between the steel sheets 210, 220 can be increased.

Further, the chemical compositions and sheet thicknesses of the steel sheets 210, 220 may be made the same or at least one of the same may be made different. Further, the shapes of the steel sheets 210, 220 may be different or may be the same. For example, when the hot stamped part is a center pillar, the steel sheet 210 forming the main member 111 may be made mild steel while the steel sheet 220 forming the reinforcing member 112 may be made a high strength steel sheet with a different thickness from the main member 111. In this case, as shown in FIG. 1, the steel sheet 220 forming the reinforcing member 112 is overlaid on part of the surface of the steel sheet 210 forming the main member 111. The combination of the plurality of steel sheets 210, 220 forming the sheet combination 200 may be suitably determined in accordance with the application of the hot stamped part or the performance etc. demanded from the hot stamped part.

Here, as the thicknesses of the steel sheets 210, 220, for example, 0.6 mm to 3.0 mm may be employed. If in this range, it is possible to reliably join members by brazing.

Heating Step

The sheet combination 200 obtained in the sheet combination production step is heated to a temperature required for shaping by the hot stamping step. The lower limit of the heating temperature is the Ac3 point of the steel sheets 210, 220. On the other hand, the upper limit of the heating temperature is not particularly set, but for example can be made 1000° C. Here, the Ac3 point is the temperature in the case expressed by the approximation formula of the following formula (1) as described in NPLT 1:

$$Ac3 = -230.5 \times [C] + 31.6 \times [Si] - 20.4 \times [Mn] - 39.8 \times [Cu] - 18.1 \times [Ni] 14.8 \times [Cr] + 16.8 \times [Mo] + 912 \qquad (1)$$

In formula (1), [C], [Si], [Mn], [Cu], [Ni], [Cr], and [Mo] are respectively the contents (mass %) of carbon, silicon, manganese, copper, nickel, chromium, and molybdenum.

There are various methods as methods of heating in the heating step. In general, a walking beam type or batch type heating furnace is used. However, the type of the heating furnace is not particularly limited. It may be an electric furnace or may be a gas furnace.

Further, in addition to a heating furnace, electrical resistance heating or high frequency heating can be used. "Electrical resistance heating" means attaching electrodes to the steel sheets 210, 220 forming the sheet combination set in a fixture and running current between the steel sheets 210, 220 so as to heat the steel sheets 210, 220.

"High frequency heating" means running the sheet combination set in a fixture through the inside of a coil carrying a high frequency current so that current flows to the steel sheets 210, 220 due to the action of electromagnetic induction and the steel sheets 210, 220 are heated.

These electrical resistance heating and high frequency heating are preferably performed in a vacuum or in an inert gas atmosphere.

In the present embodiment, as described in the specification of PLT 4, the sheet combination 200 being heated in the heating step is pressed against in the thickness direction of the steel sheets 210, 220. Due to this pressing action, when heating the sheet combination 200, it is possible to suppress the formation of a clearance between the steel sheets 210, 220 and the brazing filler metal 231. That is, the steel sheets 210, 220 and the brazing filler metal 231 can be made to contact each other as closely as possible. Note that in the later explained hot stamping step, if the brazing filler metal 231 is in a solid phase state, the above pressing operation need not be performed.

Figure 3:
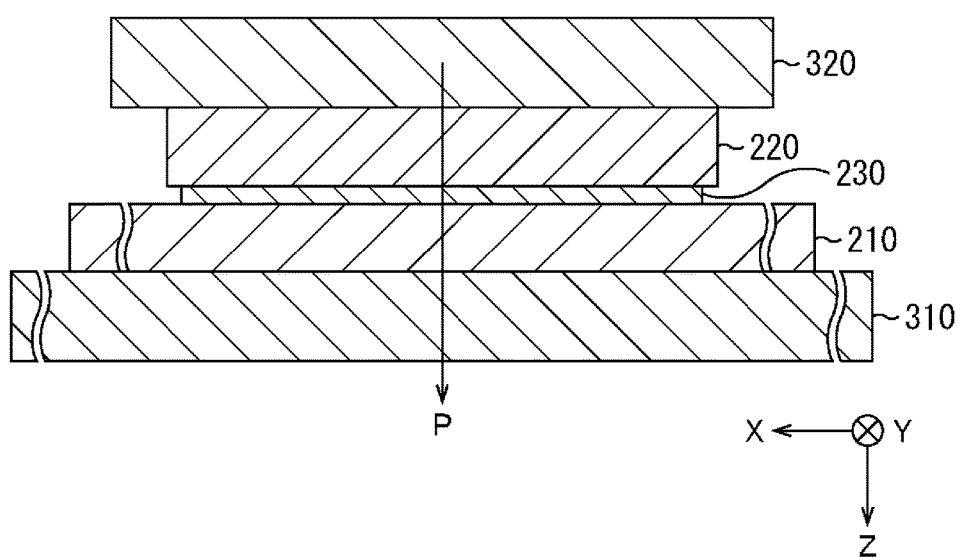
FIG. 3 is a view explaining one example of a method of applying pressure to a sheet combination.

There are various methods as the method of applying pressure to the sheet combination 200. FIG. 3 is a view explaining one example of the method of applying pressure to the sheet combination 200.

As shown in FIG. 3, a support plate 310 is placed over the entire bottom surface of the steel sheet 210. Further, a presser plate 320 is placed over the entire top surface of the steel sheet 220. Further, the sheet combination 200 clamped between the presser plate 320 and support plate 310 is heated by the heating step (heating furnace etc.) At this time, due to the inherent weight of the presser plate 320, the sheet combination 200 is pressed by a pressure P. Due to this pressing action, the steel sheets 210, 220 in the sheet combination 200 are constrained from deforming. For this reason, it is possible to suppress the formation of a clearance between the steel sheets 210, 220 and the brazing filler metal 231 (in FIG. 3, the brazing filler metal 230) in the sheet combination after heating and make the steel sheets 210, 220 and brazing filler metal 231 contact each other as closely as possible.

The support plate 310 and presser plate 320 are not particularly limited in material etc. so long as having sufficient strength and/or thickness for suppressing deformation of the steel sheets 210, 220 during heating. The preferable average load on the steel sheets 210, 220 when pressing them is $0.1 \times 10^{-3}$ to 1.0 MPa. Therefore, the presser plate 320 preferably has a weight of an extent enabling this average load to be applied to the sheet combination 200 (steel sheets 210, 220).

When heating the sheet combination while utilizing the support plate 310 and presser plate 320, the support plate 310 and presser plate 320 block the heat, so it sometimes becomes hard for the sheet combination to rise in temperature. Therefore, the support plate 310 and presser plate 320 can be made thinner in thickness or made lattice-like or net-like in structure in a range enabling strength to be secured to an extent where the steel sheets 210, 220 do not deform during heat.

The sheet combination 200 clamped between the support plate 310 and presser plate 320 is loaded into a heating apparatus for performing the heating step (heating furnace etc.) and extracted from that heating apparatus after a predetermined time or treatment.

Due to the above heating step, a blank is produced.

Hot Stamping Step

The blank produced in the heating step is conveyed to the hot stamping apparatus.

When conveying the blank, the support plate 310 may be detached from the blank (sheet combination 200) and presser plate 320 and conveyed while covering the blank. In this case, a further drop in temperature of the blank can be suppressed.

After conveying the blank, the presser plate 320 is detached from the blank and the blank is placed in the cooling die in the hot stamping apparatus. As the cooling die, for example, a water cooled type die may be employed. By hot stamping the blank placed in the cooling die in this way, a hot stamped part is produced. Due to this hot stamping step, shaping and quenching are simultaneously performed.

Further, here, the explanation was given of the example of the case of detaching the support plate 310 from the blank then conveying the blank. However, it is preferable to detach the support plate 310 and the presser plate 320 from the blank after the temperature of the sheet combination 200 becomes less than the solidus temperature of the brazing filler metal 231. This is because the brazing filler metal 231 becomes a solid phase, so it becomes difficult for a clearance to be formed between the steel sheets 210, 220 and the brazing filler metal 231.

Further, if considering the productivity, it is preferable to detach the presser plate 320 from the blank as late as possible in the time from when the heating step ends to when the blank is placed in the hot stamping apparatus. It is more preferable to detach the presser plate 320 from the blank right before placing the blank in the hot stamping apparatus.

Quenching Start Temperature in Hot Stamping Step

In the present embodiment, the steel sheets 210, 220 are cooled in the hot stamping step in the temperature region where the relationship between the quenching start temperature X (° C.) in the above hot stamping step (cooling die) and the Ar3 point (° C.) of the steel sheets 210, 220 satisfies the following formula (2):

$$X \leq Ar3 \text{ point of steel sheets (matrix)} \quad (2)$$

In this way, in the present embodiment, the quenching start temperature X° C. in the hot stamping step (cooling die) is made the temperature of the Ar3 point (° C.) of the steel sheets 210, 220 or less to cool the steel sheets 210, 220 at the hot stamping step and perform the quenching. Further, the Ar3 point is the temperature where austenite starts to transform to ferrite. Further, when the chemical composition of the steel sheet 210 and the chemical composition of the steel sheet 220 differ, the Ar3 point of the steel sheet 210 and the Ar3 point of the steel sheet 220 differ. In this case, as the Ar3 point of the formula (2), the lower Ar3 point is used.

In general technical knowledge up to now, to suppress the precipitation of ferrite and raise the quenchability (strength and rigidity of hot stamped part), it was considered preferable to make the quenching start temperature X at the hot stamping step above the Ar3 point of the steel sheets (it was considered that the quenching start temperature X was preferably higher). Here, PLT 2 discloses to insert a brazing filler metal in a blank of aluminum plated steel sheets, then insert this in the die at 700° C. In PLT 2, paragraph (0015) describes that the blank should be held at a temperature of below the liquid temperature of the brazing filler metal and above the rapid cooling start temperature and describes the rapid cooling start temperature as 700° C. without any explanation. The examples disclose cases of the die insertion temperature being 700° C., but the chemical compositions of the steel materials are not disclosed, so there is no means for determining if 700° C. is not more than the Ar3 point or less than it. Further, as the die insertion temperature, examples of a range of 700° C. to 830° C. are disclosed, but it is judged described that the bonding strength is "good" in this temperature range. How the die insertion temperature and joint strength are related is not clear either. It is not disclosed if the hardness near the brazing filler metal softens if changing the die insertion temperature.

As opposed to this, the present inventors investigated the joint strengths of various brazed joints when changing only the quenching start temperature in the hot stamping step (in the cooling die) and leaving the other conditions the same such as shown in the later explained working examples. As a result, they obtained the striking discovery, different from general technical knowledge, that if lowering the quenching start temperature, the joint strength of a brazed joint becomes higher. Further, they engaged in further investigation regarding this discovery and discovered that at the region near the brazing filler metal 231 of the steel sheets 210, 220, the hardness falls compared with other regions of the steel sheets 210, 220. Furthermore, the present inventors obtained the discovery that the mode of fracture of the brazed joint is cohesive failure (fracture inside of brazing filler metal) regardless of the quenching start temperature X at the hot stamping step (in the cooling die).

Further, in the following explanation, a region falling in hardness compared with other regions of the steel sheets 210, 220 near the brazing filler metal 231 of the steel sheets 210, 220 will be referred to as a "softened region" according to need. Further, a region other than the softened region in the regions of the steel sheets 210, 220 will be referred to as a "base metal region" according to need.

Here, the softened region is believed to be formed because in the heating step, the sheet combination 200 (steel sheets 210, 220 and brazing filler metal 231) becomes high in temperature whereby elements acting on the strength of the steel in the steel sheets 210, 220 (for example, carbon and manganese) diffuse into the brazing filler metal 231 and the amounts of the elements become smaller in the region near the brazing filler metal 231 of the steel sheets 210, 220.

That is, due to this diffusion, the amounts of elements in the softened region (carbon, manganese, etc.) become smaller compared with the original amounts of the elements at the steel sheets 210, 220. On the other hand, the Ar3 point, as described in NPLT 2, can be expressed by an approximation of the following formula (3):

$$Ar3=902-527C-62Mn+60Si \quad (3)$$

In formula (3), C, Mn, and Si are respectively the contents of carbon, manganese, and silicon (mass %).

For this reason, the Ar3 point in the softened region becomes higher than the inherent Ar3 of the steel sheets 210, 220. Therefore, if making the temperature of the Ar3 point of the steel sheets 210, 220 or less the quenching start temperature and performing the quenching (hot stamping step), since the base metal region and the softened region differ in the Ar3 point, the degree of quenching also differs. As a result, the softened region softens compared with the base metal region. Specifically, the Vicker's hardness of the softened region becomes at least 50 HV lower than the Vicker's hardness of the base metal region.

In the above way, the inventors obtained the discovery that a softened region is formed and the discovery that cohesive failure occurs. Considering these discoveries, it is thought that when a load is placed on the brazed joint, the softened region with the Vicker's hardness 50 HV or more lower than the base metal region deforms, whereby the stress concentration at the brazing filler metal is eased and that due to this easing of the stress concentration, the brazed joint is remarkably improved in strength.

As explained above, even if quenching at the Ar3 point of the steel sheets 210, 220, at the softened region, the degree of quenching is smaller than the degree of quenching of the base metal region, so softening occurs. Due to this, if making the Ar3 point of the softened region (Ar3 point rising from inherent Ar3 point of steel sheets 210, 220) Y (° C.), it is sufficient to set the quenching start temperature X (° C.) at the hot stamping step (in the cooling die) so that the following formula (4) is satisfied:

$$X<Y \quad (4)$$

It is believed that the Ar3 point at the softened region (=Y (° C.)) is dependent on the above-mentioned diffusion, so it is not easy to set it to a certain value. However, as explained above, the Ar3 point at the softened region (=Y (° C.)) becomes a temperature over the inherent Ar3 point of the steel sheets 210, 220 due to diffusion of the elements acting on the strength after quenching of the steel to the brazing filler metal. The above, that is, the following formula (5) stands:

$$Ar3 \text{ point of steel sheets(matrix)}<Y \quad (5)$$

From the above formula (4) and formula (5), the present inventors discovered that if controlling the quenching start temperature so as to satisfy the above-mentioned formula (2), it is possible to simultaneously realize quenching of the base metal region to increase the strength and softening of the softened region (due to degree of quenching being smaller than base metal region).

Further, the lower limit value of the quenching start temperature X at the hot stamping step (in the cooling die) can be suitably determined in accordance with the application of the brazed joint (hot stamped part) or the performance demanded from the brazed joint (hot stamped part). However, if making the quenching start temperature X at the hot stamping step (in the cooling die) too low, the base metal region will end up insufficiently quenched, the strength of the steel sheets 210, 220 as a whole will fall, and the effect of easing the stress concentration at the brazing filler metal will end up falling. From this viewpoint, as the lower limit value of the quenching start temperature X at the hot stamping step (in the cooling die), for example, (Ar3-100)° C. can be employed.

By performing the hot stamping step at the above quenching start temperature X, a brazed joint (in the present embodiment, the hat shaped member 110 (hot stamped part)) is produced.

Shot Blasting Step

The hat shaped member 110 (hot stamped part) produced by the hot stamping shaping step is shot blasted to remove the scale formed on the surface of the hat shaped member 110 (steel sheets 210, 220). Further, the shot blasting step can be realized by general art.

In the above way, the hat shaped member 110 is produced. Further, the flange parts of the hat shaped member 110 and the closing plate 120 are joined by for example spot welding whereby the formed part 100 is produced.

Below, the brazed joint (110) forming the formed part 100 produced in this way will be explained.

Softened Region

Figure 4:
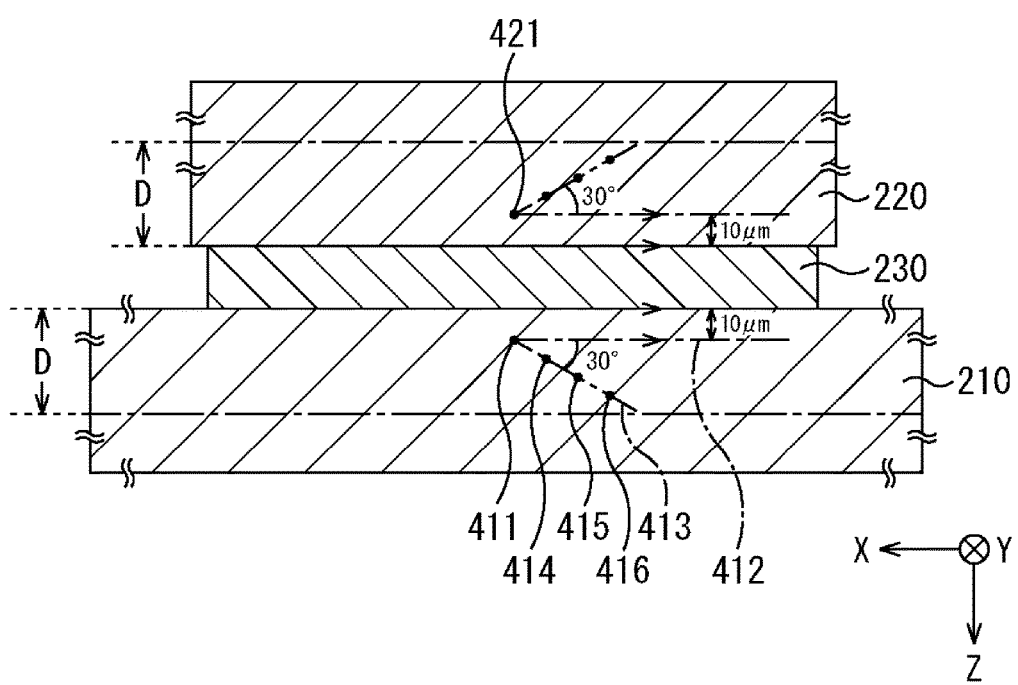
FIG. 4 is a view explaining one example of a softened region.

FIG. 4 is a view for explaining one example of a softened region. In the present embodiment, the Vicker's hardness (HV) is used to define the hardnesses of the base metal region and softened region. Further, the Vicker's hardness is measured by the method prescribed in JIS Z 2244.

Average Hardness of Positions Near Brazing Filler Metal

First, as shown in FIG. 4, the position 411 separated by exactly 10 μm from the position of the interface of the steel sheet 210 and the brazing filler metal 231 (in FIG. 4, the brazing filler metal 230) to the steel sheet 210 side along the direction of thickness of the steel sheet 210 is evaluated as a position near the brazing filler metal 231 of the steel sheet 210. For the steel sheet 220 as well, the position 421 separated by exactly 10 μm from the position of the interface of the steel sheet 220 and the brazing filler metal 231 to the steel sheet 220 side along the direction of thickness of the steel sheet 220 is evaluated as a position near the brazing filler metal 231 of the steel sheet 220. In the following explanation, the positions 411, 421 will be referred to as the "positions near the brazing filler metal" in accordance with need.

Further, in FIG. 4, the positions at the centers of the steel sheets 210, 220 in the X-axial directions are shown as the positions 411, 421 near the brazing filler metal. However, the positions near the brazing filler metal may be any positions separated by exactly 10 μm from the positions of the interfaces of steel sheets 210, 220 and brazing filler metal 231 to the steel sheet 210, 220 sides along the directions of thickness of the steel sheets 210, 220 and need not be positions at the centers of the steel sheets 210, 220 in the X-axial direction.

When measuring the Vicker's hardness, for example, the steel sheets 210, 220 are cut and polished to obtain cross-sections vertical to the surfaces of the steel sheets 210, 220 (cross-sections such as shown in FIG. 4) as measurement surfaces.

An indenter is pressed into three measurement positions of the measurement surfaces obtained in this way by a load of 10 gf in the sheet surface direction. From the results, the steel sheets 210, 220 are measured for the average hardnesses for the positions near the brazing filler metal. Specifically, the following steps (a) to (e) are used to measure the average hardness of the positions near the brazing filler metal.

(a) First, any one location of a position near the brazing filler metal contained in the measurement surface (position separated by exactly 10 μm from position of interface between steel sheet 210 and brazing filler metal 231 to steel sheet 210 side in direction of thickness of steel sheet 210) is selected as a measurement position. The Vicker's hardness at that measurement position is measured.

(b) Next, the length of 3X the arithmetic average "d" of the lengths of the two diagonals of the indentation formed at the measurement position selected at the above (a) (=3xd) is found.

(c) Next, positions of two locations on the measurement surface separated from the center of indentation formed at the measurement position selected at the above (a) by exactly the length found at the above (b) (=3xd) and on a line passing through the center of the indentation and parallel to the interface between the steel sheet 210 and the brazing filler metal 231 are specified as measurement positions (positions near brazing filler metal).

(d) Next, the Vicker's hardnesses at the measurement positions of the two locations specified at the above (c) are measured.

(e) Finally, the arithmetic average of the Vicker's hardnesses at the three locations (positions near brazing filler metal) measured in the above way is found. This arithmetic average is made the average hardness of the positions near the brazing filler metal.

The average hardness of the positions near the brazing filler metal above is calculated for each of the steel sheets 210, 220.

Thickness D of Softened Region

In the present embodiment, the thickness D (μm) of the softened region calculated in the later explained "Determination of Softened Region" (length of softened region in thickness direction of steel sheets 210, 220) is made 10 μm to the sum of ½₀ of the thicknesses t1 (μm), t2 (μm) of the steel sheets 210, 220 (two steel sheets contacting brazing filler metal 231). That is, the following formula (6) is considered to stand. Here, the thickness of the steel sheet 210 is defined as t1 (μm), while the thickness of the steel sheet 220 is defined as t2 (μm).

$$10 \leq D \leq t1 \times (1/20) + t2 \times (1/20) \quad (6)$$

The present inventors performed hot stamping operations under various conditions satisfying the conditions explained in the above-mentioned "Quenching Start Temperature at Hot Stamping Step", including the later explained working examples, and obtained the following discoveries from the results.

First, they obtained the discovery that if the thickness D of the softened region is 10 μm or more, the softened region reliably contributes to improvement of the joint strength of the brazed joint. Therefore, in the present embodiment, it was decided to set the lower limit of the thickness D of the softened region like in the above formula (6).

Further, they obtained the discovery that to make the thickness D of the softened region the sum of ½₀th of the thicknesses t1 (μm) and t2 (μm) of the steel sheets 210, 220, it is necessary to make the quenching start temperature X at the hot stamping step (in the cooling die) a value of (Ar3-100)° C. or less. If as explained above, making the quenching start temperature X at the hot stamping step (in the cooling die) a value of (Ar3-100)° C. or less, the overall strength of the steel sheets 210, 220 is liable to fall too much. Therefore, in the present embodiment, it was decided to set the upper limit of the thickness D of the softened region like in the above formula (6).

Average Hardness of Representative Positions of Base Metal Region

In the regions of the steel sheet 210, the region other than the softened region becomes the base metal region. As explained above, in the present embodiment, the upper limit value of the thickness D of the softened region is determined by the above formula (6). Therefore, in the present embodiment, a region in the surfaces of the steel sheets 210, 220 separated from the surfaces at the side not contacting the brazing filler metal 231 by at least 19/20 of the thicknesses t1 (μm), t2 (μm) of the steel sheets 210, 220 along the thickness direction of the steel sheets 210, 220 becomes the base metal region.

Therefore, in the present embodiment, a position separated from the surface of the steel sheet 210 at the side not contacting the brazing filler metal 231 among the two surfaces of the sheet (sheet surfaces) by exactly a length of ¼ of the thickness t1 (μm) of the steel sheet 210 to the steel sheet 210 side along the direction of thickness of the steel sheet 210 is evaluated as a representative position of the base metal region in the steel sheet 210. For the steel sheet 220 as well, a position separated from the surface of the steel sheet 220 at the side not contacting the brazing filler metal 231 among the two surfaces of the sheet (sheet surfaces) by exactly a length of ¼ of the thickness t2 (μm) of the steel sheet 220 to the steel sheet 220 side along the direction of thickness of the steel sheet 220 is evaluated as a representative position of the base metal region in the steel sheet 220. Such a position is made a representative position of the base metal region because if a steel sheet applied to a brazed joint, no matter what kind of steel sheet, that position is included in the base metal region.

When measuring the Vicker's hardness, in the same way as when measuring the average hardness of the positions near the brazing filler metal, for example, steel sheets 210, 220 are cut and polished to obtain cross-sections vertical to the surfaces of the steel sheets 210, 220 (cross-sections such as shown in FIG. 4) as measurement surfaces.

An indenter was pressed at three measurement positions of the measurement surfaces obtained in this way by a load of 10 gf in the sheet surface direction. From the results, the steel sheets 210, 220 are measured for the average hardness of representative positions of the base metal region. Specifically, the following steps (f) to (g) are used to measure the average hardness of representative positions of the base metal region.

(f) First, any one location of a representative position of the base metal region contained in the measurement surface (position separated by exactly length of ¼ of thickness t1 (μm) of steel sheet 210 (=t1¼) from surface of steel sheet 210 not contacting brazing filler metal 231 among two surfaces of sheet (sheet surfaces) to the steel sheet 210 side along the direction of thickness of steel sheet 210) is selected as a measurement position. The Vicker's hardness at that measurement position is measured.

(g) Next, any one location of a representative position of the base metal region contained in the measurement surface (position exactly length of ¼ of thickness t2 (μm) of steel sheet 220 (=t2¼) away from surface of steel sheet 220 not contacting brazing filler metal 231 among two surfaces of sheet (sheet surfaces) to steel sheet 220 side along direction of thickness of steel sheet 220) is selected as a measurement position. The Vicker's hardness at that measurement position is measured.

(h) Finally, the arithmetic average of the two Vicker's hardnesses measured in the above steps (f) and (g) is found.

This arithmetic average is made the average hardness of the representative positions of the base metal region.

Relationship of Average Hardness of Positions Near Brazing Filler Metal and Average Hardness of Representative Positions of Base Metal Region The present inventors performed hot stamping operations under various conditions satisfying the conditions explained in the above-mentioned "Quenching Start Temperature in Hot Stamping Step" including the later explained working examples. As a result, they obtained the discovery that when satisfying the conditions explained in the above-mentioned "Quenching Start Temperature in Hot Stamping Step", the values of the average hardness of the positions near the brazing filler metal at the steel sheets 210, 220 plus 50 HV become less than the average hardnesses of the representative positions of the base metal regions in the steel sheets 210, 220. That is, they obtained the discovery that the following formula (7) stands.

Average hardness (HV) of positions near brazing filler metal+50 HV<Average hardness (HV) of representative positions of base metal region  (7)

However, as explained above, the softened region contributes more greatly to improvement of the joint strength of the brazed joint the more the hardness falls compared with the hardness of the base metal region. Therefore, preferably the values of the average hardness of the positions near the brazing filler metal at the steel sheets 210, 220 plus 100 HV are less than the average hardnesses of the representative positions of the base metal regions in the steel sheets 210, 220. That is, preferably the following formula (8) stands.

Average hardness (HV) of positions near brazing filler metal+100 HV<Average hardness (HV) of representative positions of base metal region  (8)

Determination of Softened Region

A position near the brazing filler metal is a position included in the softened region. In the present embodiment, when prescribing the relationship between the average hardness of positions near the brazing filler metal and the average hardness of representative positions of the base metal region by the relationship of the formula (7), the region where the following formula (9) stands is defined as the softened region.

Hardness (HV) of softened region+50 HV<Average hardness (HV) of representative positions of base metal region  (9)

That is, the steel sheet 210 is pressed by an indenter by a load of 10 gf in the sheet surface direction. The region where the Vicker's hardness (HV) measured from the result plus 50 HV becomes less than the average hardness (HV) of representative positions of the base metal region is defined as the softened region.

On the other hand, when the relationship between the average hardness of the positions near the brazing filler metal and the average hardness of representative positions of the base metal region satisfies the relationship of the formula (8), it is possible to prescribe the region where the following formula (10) stands. The region where this formula (10) stands is included in the softened region of the region where the formula (9) stands.

Hardness (HV) of softened region+100 HV<Average hardness (HV) of representative positions of base metal region  (10)

That is, the steel sheet 210 is pressed by an indenter by a load of 10 gf in the sheet surface direction. The region where the value of the Vicker's hardness (HV) measured from the result plus 100 HV becomes less than the average hardness (HV) of representative positions of the base metal region is defined as the region where the formula (10) stands.

Here, in the present embodiment, in both of the above formula (9) and the above formula (10), the measurement position of the Vicker's hardness at the steel sheet 210 is determined as follows:

First, a second imaginary line (in the example shown in FIG. 4, second imaginary line 413) is set passing through the above-mentioned position near the brazing filler metal (in the example shown in FIG. 4, position 411 near brazing filler metal) and having a 30° angle with a first imaginary line (in the example shown in FIG. 4, first imaginary line 412) parallel to the interface of the steel sheet 210 and brazing filler metal 231.

A position on the second imaginary line and separated from the position near the brazing filler metal to the side opposite to the side where the brazing filler metal 231 is formed by exactly 3 times the arithmetic average value "d" of the lengths of the two diagonals of the indentation at the position near the brazing filler metal (=3xd) (in the example shown in FIG. 4, the position 414) is pressed by an indenter by a load of 10 gf in the sheet surface direction. From the result, the Vicker's hardness is measured. When this Vicker's hardness satisfies the above formula (9) or formula (10), the position 414 is deemed to be included in the softened region.

Further, a position separated from the position 414 at the side opposite to the side where the brazing filler metal 231 is formed by exactly 3 times the arithmetic average value "d" of the lengths of the two diagonals of the indentation at the position 414 (=3xd) (in the example shown in FIG. 4, the position 415) is pressed by an indenter by a load of 10 gf in the sheet surface direction. From the result, the Vicker's hardness is measured. When this Vicker's hardness satisfies the above formula (9) or formula (10), the position 415 is deemed to be included in the softened region.

Furthermore, a position separated from the position 415 at the side opposite to the side where the brazing filler metal 231 is formed by exactly 3 times the arithmetic average value "d" of the lengths of the two diagonals of the indentation at the position 415 (=3xd) (in the example shown in FIG. 4, the position 416) is pressed by an indenter by a load of 10 gf in the sheet surface direction. From the result, the Vicker's hardness is measured. When this Vicker's hardness satisfies the above formula (9) or formula (10), the position 416 is deemed to be included in the softened region.

The above measurement is performed until the measured Vicker's hardness no longer satisfies the formula (9). Further, the length in the sheet thickness direction of the steel sheet 210 from the surface of the steel sheet 210 contacting the brazing filler metal 231 among the two surfaces of the sheet to the position last satisfying the formula (9) is determined as the thickness D of the softened region in the steel sheet 210. The softened region of the steel sheet 220 can also be determined in the same way as the steel sheet 210.

As explained above, in the present embodiment, the Vicker's hardness is measured along the second imaginary line 413 passing through the position 411 near the brazing filler metal and having a 30° angle with a first imaginary line 412 parallel to the interface of the steel sheets 210, 220 and brazing filler metal 231. Therefore, compared with when measuring the Vicker's hardness along the thickness direction of the steel sheets 210, 220 (so that angle formed by first imaginary line and second imaginary line becomes 90°), it is possible to measure more precisely the distribution of Vicker's hardness in the thickness direction of the steel sheets 210, 220 (possible to make the measurement intervals of the Vicker's hardness in the thickness direction of the steel sheets 210, 220 finer).

Examples

Next, examples will be explained. Further, the present invention is not limited to the following examples.

Sheet Combination

Six steel sheets shown in No. 1 to No. 6 in Table 1 were prepared. The carbon equivalent Ceq shown in Table 1 was determined by the following formula (11).

$$Ceq = C + Sr/40 + Cr/20 \tag{11}$$

where in (11), C, Si, and Cr are respectively carbon, silicon, and chromium.

The No. 1 steel sheet and the No. 2 steel sheet shown in Table 1 differ only in sheet thickness. The Ar3 point of the No. 1 steel sheet and the No. 2 steel sheet (determined by formula (3)) is 727° C., while the Ac3 point is 842° C.

The No. 3 steel sheet and the No. 4 steel sheet differ only in sheet thickness. The Ar3 point of the No. 3 steel sheet and the No. 4 steel sheet (determined by the formula (3)) is 711° C., while the Ac3 point is 835° C.

The No. 5 steel sheet and the No. 6 steel sheet had Ar3 points less than 700° C. The Ar3 points of the No. 5 steel sheet and the Ar3 point of the No. 6 steel sheet (determined by formula (3)) are respectively 680° C. and 693, while the Ac3 points are respectively 822° C. and 825° C.

Further, the four No. 1 to No. 3 and No. 5 steel sheets were all steel sheets not plated on their surfaces (nonplated steel sheets). The No. 4 steel sheet is a hot dip galvanized steel sheet, while the No. 6 steel sheet is a hot dip galvannealed steel sheet.

TABLE 1

| No. | Sheet thickness | Carbon equivalent |
| --- | --- | --- |
| 1 | 1.4 | 0.23 |
| 2 | 2.3 | 0.23 |
| 3 | 1.4 | 0.26 |
| 4 | 2.3 | 0.26 |
| 5 | 1.4 | 0.31 |
| 6 | 1.4 | 0.32 |

Evaluation of Brazed Joint

A thickness 30 μm brazing filler metal was placed between the surfaces of two steel sheets of the same number in Table 1 ("No.") (for example, No. 1 steel sheets) to prepare a sheet combination. Here, the size of the surface of the steel sheet in each case was a width of 50 mm and a length of 50 mm. Further, the two steel sheets were overlaid over their entire surfaces. Brazing filler metal was placed at the entire overlaid region.

Next, the sheet combination was loaded into a heating furnace with a furnace temperature of 1000° C. and the heating step was performed. The dwell time inside the furnace (joining time) was made 5 min, and the furnace atmosphere was made a reducing atmosphere. In this embodiment, at the time of furnace heating, the pressure applied to the sheet combination was made $1.0 \times 10^{-3}$ MPa.

After performing the heating step under the above conditions, an internally water-cooled flat press (using a top die and bottom die both with flat shaping surfaces) was used to clamp the sheet combination from above and below and perform the hot stamping step. The die cooling rate at the hot stamping step was made 45° C./sec in all cases.

The brazed joint obtained by performing the hot stamping step was measured by the above-mentioned methods for the average hardness of representative positions of the base metal region (measurement of positions at ¼ of sheet thicknesses), average hardness of positions near the brazing filler metal (measurement of 3 points of positions 10 μm away from brazing filler metal), and thickness of the softened region. The results are shown in Table 2 and Table 3.

TABLE 2

| | | 850° C. quenching (comparative examples) | | | 700° C. quenching (invention examples) | | |
| --- | --- | --- | --- | --- | --- | --- | --- |
| Combination of sheets | Brazing filler metal | Average hardness of representative positions of base metal region (HV) | Average hardness of positions near brazing filler metal (HV) | Thickness of softened region (μm) | Average hardness of representative positions of base metal region (HV) | Average hardness of positions near brazing filler metal (HV) | Thickness of softened region (μm) |
| 1-1 | A | 454 | 450 | None | 440 | 335 | 40 |
| 2-2 | A | 454 | 450 | | 435 | 330 | 35 |
| 3-3 | A | 502 | 495 | | 490 | 370 | 40 |
| 4-4 | A | 502 | 495 | | 494 | 350 | 42 |

TABLE 3

| | | 850° C. quenching (comparative examples) | | | 700° C. quenching (invention examples) | | |
|---|---|---|---|---|---|---|---|
| Combination of sheets | Brazing filler metal | Average hardness of representative positions of base metal region (HV) | Average hardness of positions near brazing filler metal (HV) | Thickness of softened region (μm) | Average hardness of representative positions of base metal region (HV) | Average hardness of positions near brazing filler metal (HV) | Thickness of softened region (μm) |
| 5-5 | A | 550 | 545 | None | 530 | 380 | 40 |
| 6-6 | A | 550 | 543 | | 535 | 400 | 36 |

In Table 2 and Table 3, the "Combination of sheets" corresponds to the numbers shown in Table 1 ("No."). "Combinations of sheets" of "1-1", "2-2", "3-3", "4-4", "5-5", and "6-6" respectively show use of two of the No. 1, No. 2, No. 3, No. 4, No. 5, and No. 6 steel sheets shown in Table 1. The same is true in the later explained Table 4 and Table 5 as well.

Further, in Table 2 and Table 3, "A" in the column of "brazing filler metal" shows use of Cu-Sn20% braze (solidus temperature 770° C., liquidus temperature 930° C.) as the brazing filler metal. The same is true in the later explained Table 4 and Table 5 as well.

Further, in Table 2, "850° C. quenching" shows that the quenching start temperature X in the hot stamping step was made 850° C. "700° C. quenching" shows that the quenching start temperature X in the hot stamping step was made 700° C. As explained above, the Ar3 points of the No. 1 steel sheet and No. 2 steel sheet are 727° C., while the Ar3 points of the No. 3 steel sheet and No. 4 steel sheet are 711° C. Therefore, "850° C. quenching" are examples not satisfying the condition of the above-mentioned formula (2) (are comparative examples). On the other hand, "700° C. quenching" are examples satisfying the condition of the above-mentioned formula (2) (are invention examples).

Similarly, in Table 3, "850° C. quenching" shows that the quenching start temperature X in the hot stamping step was made 850° C. "650° C. quenching" shows that the quenching start temperature X in the hot stamping step was made 650° C. As explained above, the Ar3 point of the No. 5 steel sheet is 680° C., while the Ar3 point of the No. 6 steel sheet is 693° C. Therefore, "850° C. quenching" are examples not satisfying the condition of the above-mentioned formula (2) (are comparative examples). On the other hand, "650° C. quenching" are examples satisfying the condition of the above-mentioned formula (2) (are invention examples).

In addition, in Table 2 and Table 3, "Average hardness of representative positions of base metal region", "Average hardness of positions near brazing filler metal", and "Thickness of softened region" were all explained in the present embodiment. The same is true in the later explained Table 6 and Table 7 as well.

However, here, the region satisfying the above-mentioned formula (9) is designated as the softened region. That is, a region with a value of the Vicker's hardness smaller than the value of the average hardness (HV) of representative positions of the base metal region minus 50 HV was specified as the "softened region".

As shown in Table 2 and Table 3, it will be understood that if the condition of formula (2) is not satisfied, the average hardness of positions near the brazing filler metal will not fall much at all from the average hardness of the representative positions of the base metal region. Further, the softened region is not formed. On the other hand, if the condition of formula (2) is satisfied, the average hardness of positions near the brazing filler metal falls 50 HV or more from the average hardness of representative positions of the base metal region. Further, it will be understood that a softened region having a thickness of 30 μm or more is formed.

Evaluation of Hot Stamped Part

Figure 5:
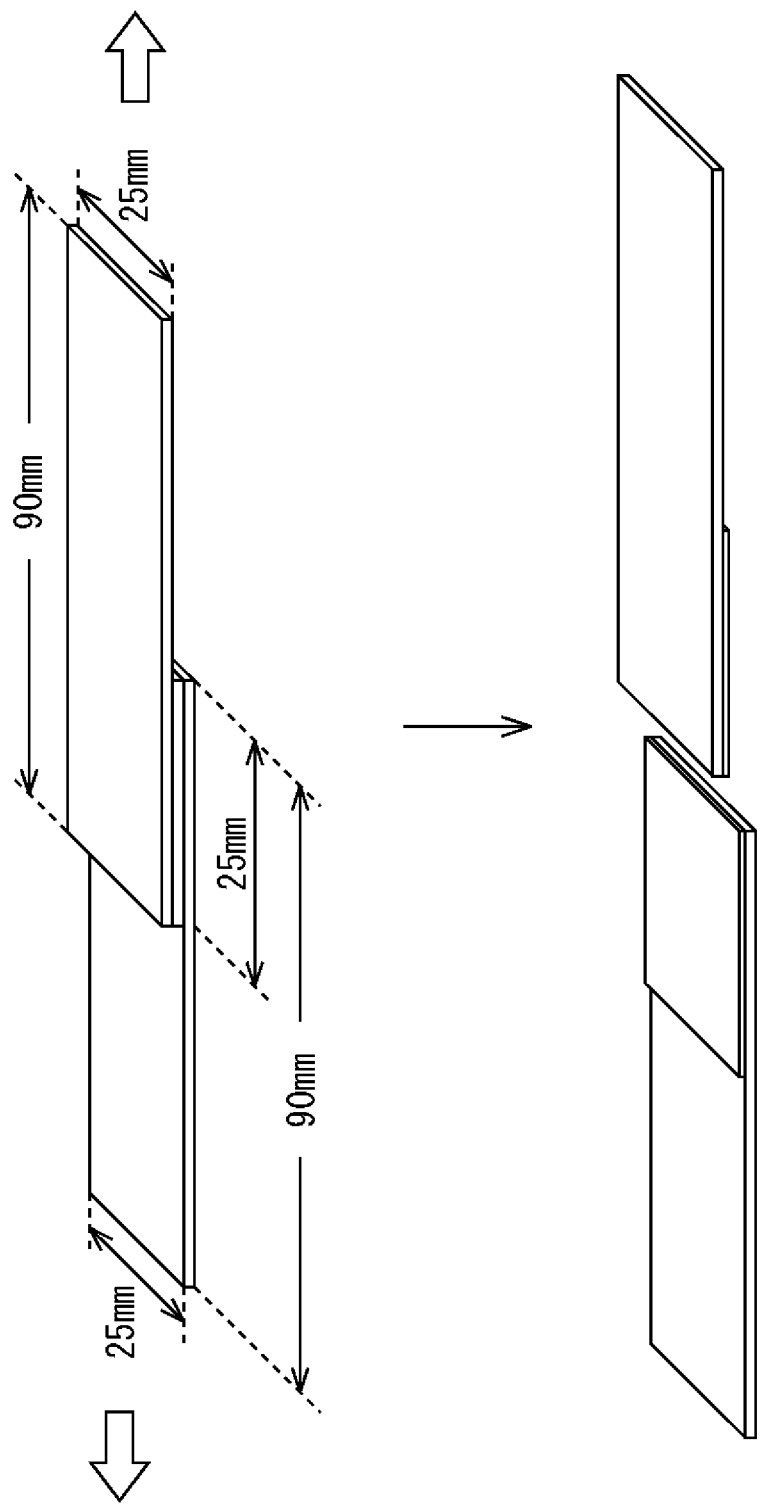
FIG. 5 is a view showing a shape of a test piece in a tensile shear test in the examples.

FIG. 5 is a view showing the shape of a test piece of a tensile shear test. Between the surfaces of two steel sheets of the same number ("No.") in Table 1 (for example, No. 1 steel sheets), thickness 30 μm brazing filler metal was placed to produce a sheet combination (test piece of tensile shear test).

As shown in the top figure of FIG. 5, two steel sheets of widths of 25 mm and lengths of 90 mm were set so that the entireties of the regions in the width direction were overlaid and regions of 25 mm were overlaid from the front end along the long direction. A brazing filler metal was placed at the entire overlapping region (25 mm×25 mm region).

Figure 6:
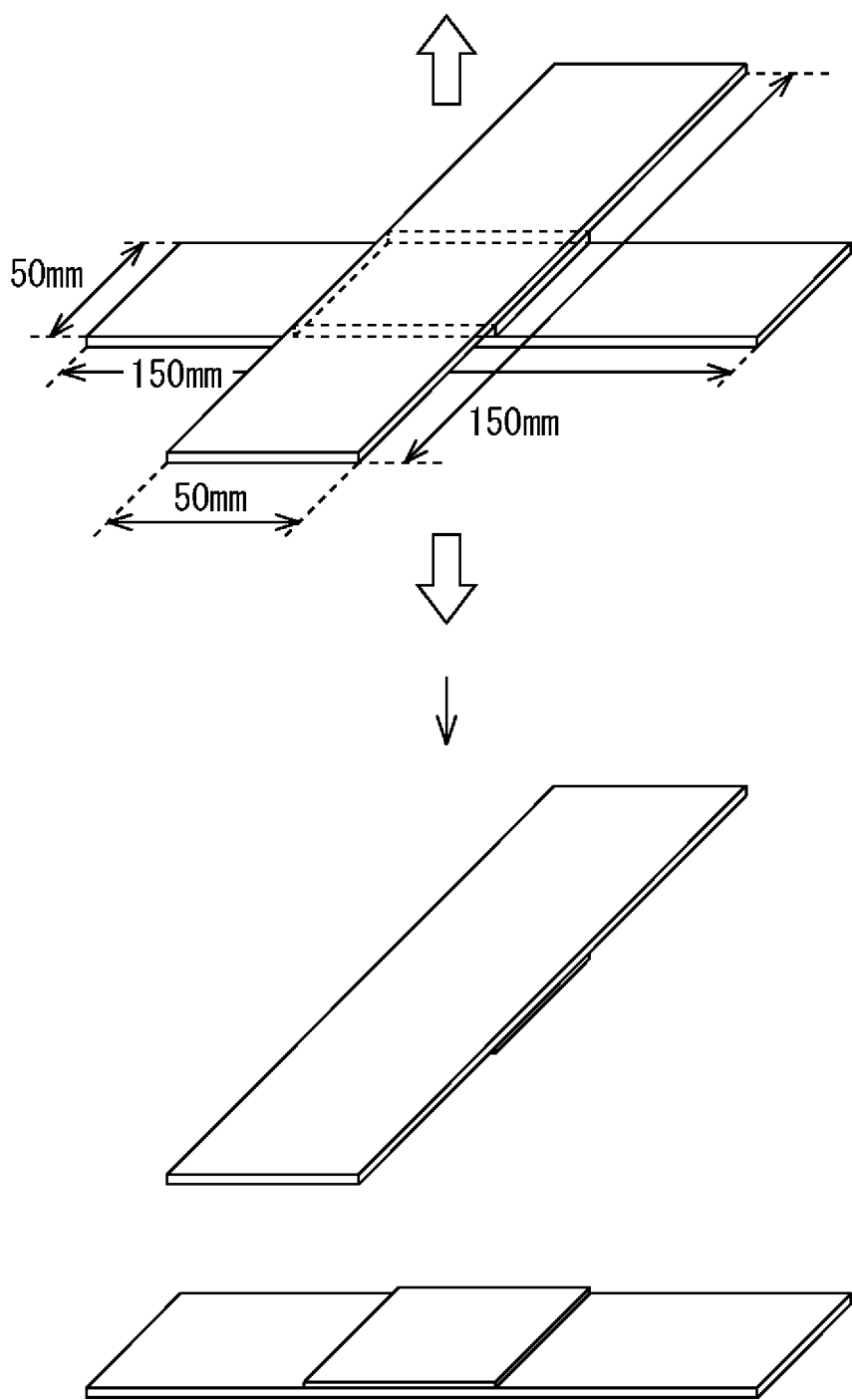
FIG. 6 is a view showing the shape of a test piece in a cross tensile test in the examples.

FIG. 6 is a view showing the shape of a test piece of a cross tensile test. Between the surfaces of two steel sheets of the same number ("No.") in Table 1 (for example, No. 1 steel sheets), thickness 30 μm brazing filler metal was placed to produce a sheet combination (test piece of cross tensile test).

As shown in the top figure of FIG. 6, two steel sheets of widths 50 mm and lengths 150 mm were placed so that 50 mm×50 mm square regions at their centers overlapped. A brazing filler metal was placed at the entire overlapping region (50 mm×50 mm region).

The thus produced sheet assemblies (test pieces for tensile shear tests and test pieces for cross tensile tests) were subjected to heating steps and hot stamping steps under the same conditions as the above-mentioned brazed joint (see section on "Evaluation of Brazed Joint").

A brazed joint obtained by the hot stamping step (test piece for tensile strength test) was subjected to a tensile shear test by a technique based on JIS Z3136 to measure the tensile shear strength (TSS). Further, the direction of tension at the time of the tensile shear test was the direction of the white arrows shown in the bottom figure of FIG. 5.

Further, a brazed joint obtained by the same hot stamping step (test piece for cross tensile test) was subjected to a cross tensile test by a technique based on JIS Z3137 to measure the cross tensile strength (CTS). Further, the direction of tension at the time of the cross tensile test was the direction of the white arrows shown in the bottom figure of FIG. 6.

In a hot stamped part such as the hat shaped member 110 shown in FIG. 1, the form of the imparted stress differs depending on the location. The form of the stress can be approximated by the combination of stresses when force acts in the directions of the white arrows shown in the bottom figures of FIG. 5 and FIG. 6. Therefore, when satisfying the above-mentioned formula (2), compared with when not, if both the tensile shear strength (TSS) and cross tensile strength (CTS) are improved, it can be said that the joint strength is improved no matter how the brazed joint is shaped. Therefore, here, a hot stamped part is evaluated by evaluating the tensile shear strength (TSS) and the cross tensile strength (CTS). The results are shown in Table 4 to Table 7.

TABLE 4

| Combination of sheets | Brazing filler metal | TSS (kN) | | CTS (kN) | |
|---|---|---|---|---|---|
| | | Quenching start temperature (° C.) | | | |
| | | 850 (comparative examples) | 700 (invention examples) | 850 (comparative examples) | 700 (invention examples) |
| 1-1 | A | 31.8 | 40.5 | 3.3 | 4.7 |
| 2-2 | A | 34.55 | 46.5 | 3.7 | 5.22 |
| 3-3 | A | 33.6 | 42.3 | 3.5 | 4 |
| 4-4 | A | 35.7 | 48.2 | 3 | 3.5 |
| 1-1 | B | 36.1 | 40.5 | 4.4 | 6.7 |
| 2-2 | B | 40.3 | 45.1 | 4.2 | 6.2 |
| 3-3 | B | 38.5 | 42.6 | 4.6 | 7 |
| 4-4 | B | 43.7 | 49.5 | 3.6 | 5.5 |

TABLE 5

| Combination of sheets | Brazing filler metal | TSS (kN) | | CTS (kN) | |
|---|---|---|---|---|---|
| | | Quenching start temperature (° C.) | | | |
| | | 850 (comparative examples) | 650 (invention examples) | 850 (comparative examples) | 650 (invention examples) |
| 5-5 | A | 32.6 | 38.3 | 3.2 | 4.5 |
| 6-6 | A | 30.5 | 36.6 | 2.9 | 4.4 |
| 5-5 | B | 33.2 | 49.6 | 3.1 | 4 |
| 6-6 | B | 34.5 | 47.5 | 2.7 | 3.3 |

TABLE 6

| Quenching start temperature (° C.) | TSS (kN) | Average hardness of representative positions of base metal region (HV) | Average hardness of positions near brazing filler metal (HV) | Thickness of softened region (μm) | Remarks |
|---|---|---|---|---|---|
| 850 | 34.55 | 460 | 460 | 0 | Comparative example |
| 770 | 31.9 | 455 | 454 | 0 | Comparative example |
| 735 | 33.3 | 450 | 440 | 0 | Comparative example |
| 718 | 39.05 | 440 | 388 | 23 | Invention example |
| 694 | 46.5 | 435 | 330 | 35 | Invention example |
| 670 | 54.1 | 430 | 300 | 40 | Invention example |
| 635 | 49.9 | 420 | 298 | 60 | Invention example |

TABLE 6-continued

| Quenching start temperature (° C.) | TSS (kN) | Average hardness of representative positions of base metal region (HV) | Average hardness of positions near brazing filler metal (HV) | Thickness of softened region (μm) | Remarks |
|---|---|---|---|---|---|
| 620 | 35 | 370 | 270 | 100 | Reference example |
| 580 | 32 | 350 | 250 | 130 | Reference example |

TABLE 7

| Quenching start temperature (° C.) | CTS (kN) | Average hardness of representative positions of base metal region (HV) | Average hardness of positions near brazing filler metal (HV) | Thickness of softened region (μm) | Remarks |
|---|---|---|---|---|---|
| 850 | 3.7 | 460 | 460 | 0 | Comparative example |
| 765 | 3.8 | 455 | 454 | 0 | Comparative example |
| 740 | 3.7 | 445 | 440 | 0 | Comparative example |
| 720 | 5 | 440 | 388 | 20 | Invention example |
| 696 | 5.4 | 435 | 330 | 35 | Invention example |
| 671 | 6.5 | 430 | 300 | 40 | Invention example |
| 633 | 5.5 | 420 | 298 | 65 | Invention example |
| 623 | 3.9 | 370 | 270 | 100 | Reference example |
| 581 | 3.7 | 350 | 250 | 130 | Reference example |

In Table 4 and Table 5, "B" in the column of "brazing filler metal" shows use of Cu—Zn30% braze (solidus temperature 900° C., liquidus temperature 930° C.) as the brazing filler metal.

The "quenching (start) temperature" in Table 4 to Table 7 shows the quenching start temperature X at the hot stamping step. Table 4 shows the measurement results for the tensile shear strength (TSS) and the cross tensile strength (CTS) for the cases where the "quenching (start) temperature" is 850° C. and 700° C. As explained while referring to Table 2, the measurement results when the "quenching (start) temperature" is 850° C. are examples not satisfying the condition of the above-mentioned formula (2) (are comparative examples). On the other hand, the measurement results when the "quenching (start) temperature" is 700° C. are examples satisfying the condition of the above-mentioned formula (2) (are invention examples). Further, Table 5 shows the measurement results of the tensile shear strength (TSS) and cross tensile strength (CTS) for the cases where the "quenching (start) temperature" is 850° C. and is 650° C. As explained while referring to Table 3, the measurement results when the "quenching (start) temperature" is 850° C. are examples not satisfying the condition of the above-mentioned formula (2) (are comparative examples). On the other hand, the measurement results when the "quenching (start) temperature" is 650° C. are examples satisfying the condition of the above-mentioned formula (2) (are invention examples).

As shown in Table 4 and Table 5, it will be understood that regardless of the combination of the sheets and the type of the brazing filler metal, compared with when the condition of the formula (2) is not satisfied, when it is satisfied, both the tensile shear strength (TSS) and cross tensile strength (CTS) can be improved.

Figure 7:
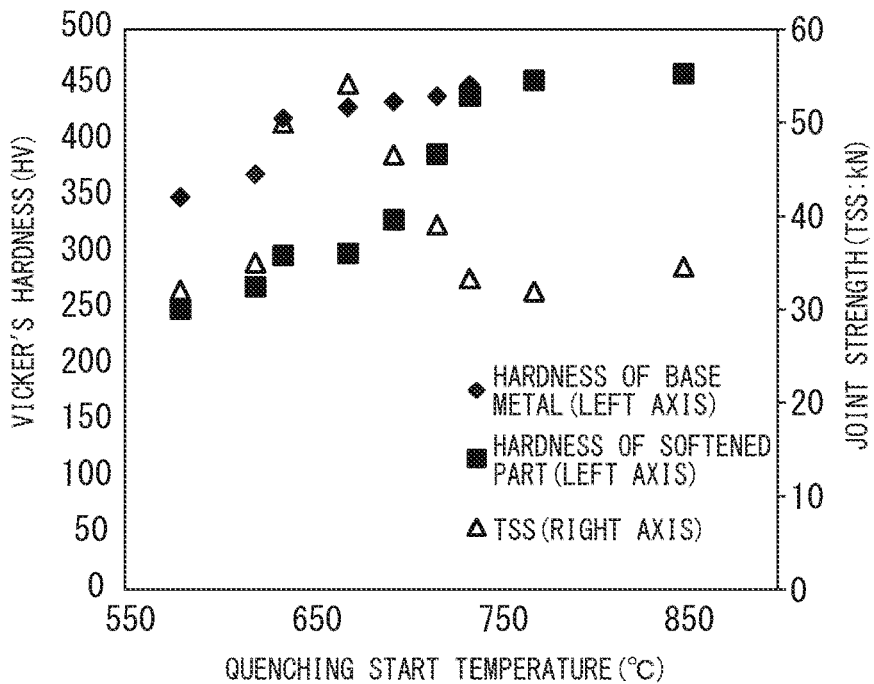
FIG. 7 is a view showing a relationship between a tensile shear strength (TSS) and quenching start temperature in the examples.
Figure 8:
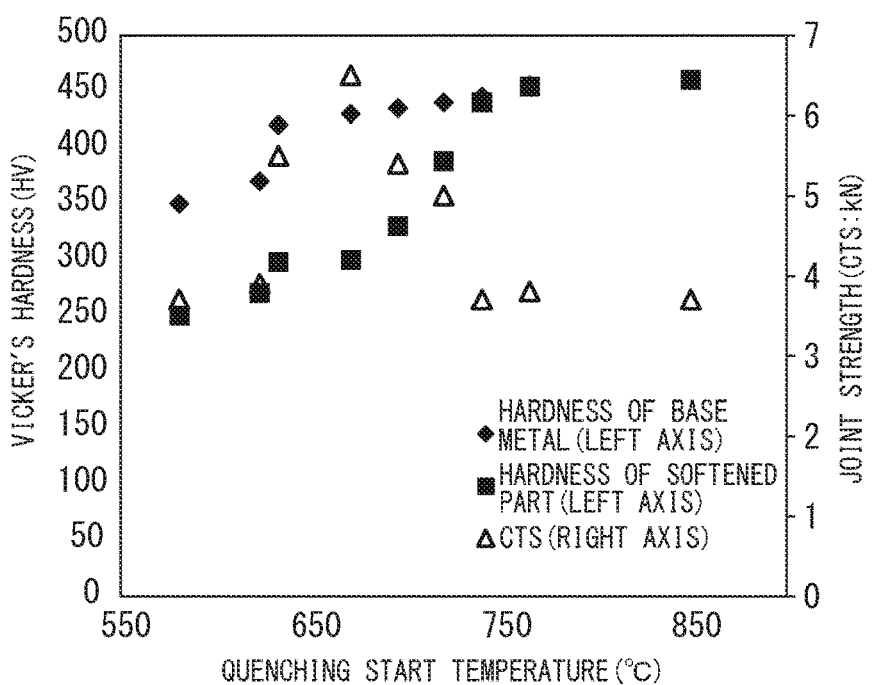
FIG. 8 is a view showing a relationship between a cross tensile strength (CTS) and a quenching start temperature in the examples.

Further, Table 6 and Table 7 show the measurement results of the tensile shear strength (TSS) and cross tensile strength (CTS) for the cases where the "quenching temperature" (quenching start temperature X in hot stamping step) differs for the case of the "combination of sheets" of "2-2". The measurement results of Tables 6 and 7 are graphed and shown in FIGS. 7 and 8.

As shown in Table 6 and Table 7, it will be understood that if the "quenching temperature" becomes lower, both the tensile shear strength (TSS) and cross tensile strength (CTS) tend to become larger.

As explained above, the Ar3 point of the No. 2 steel sheet is 727° C. In Table 6 and Table 7, the measurement results when the "quenching temperature" exceeds this temperature become examples not satisfying formula (2) (are comparative examples). On the other hand, the measurement results when the "quenching temperature" is this temperature or less become examples satisfying formula (2) (are invention examples).

As shown in Table 6 and Table 7, when changing the range of the "quenching temperature", as explained with reference to Table 2 and Table 3, it will be understood that if the condition of formula (2) is not satisfied, the average hardness of positions near the brazing filler metal will not fall much at all from the average hardness of representative positions of the base metal region. This will be visually apparent from FIGS. 7 and 8. Further, the softened region was not formed. On the other hand, it will be understood that if the condition of formula (2) is satisfied, the average hardness of positions near the brazing filler metal falls 50 HV or more from the average hardness of representative positions of the base metal region. This will be visually apparent from FIGS. 7 and 8. Further, it will be understood that a softened region having a thickness of 10 μm or more is formed.

In particular, when the quenching start temperature X is (Ar3 point −100) (° C.) to the Ar3 point (° C.), the base metal region is sufficiently quenched and the hardness rises. Further, the softened region formed can ease the stress concentration at the brazing filler metal, so both the tensile shear strength (TSS) and cross tensile strength (CTS) become larger. This will be visually understood from FIGS. 7 and 8.

Further, in the present embodiment, the results of combinations of the same types of sheets are shown. Other explanations of the combinations of sheets will be omitted. However, the inventors confirmed that a similar trend is obtained as explained in the present embodiment for the combination of different types of sheets.

Summary

In the above way, in the present embodiment, the sheet combination 200 comprised of the steel sheets 210, 220 between which a brazing filler metal 231 is sandwiched is heated by a temperature of the Ac3 point of the steel sheets (matrix) or more, then is hot stamped using as the quenching start temperature X the temperature of the Ar3 point of the steel sheet (matrix) to thereby produce the brazed joint. By doing this, it is possible to make the Vicker's hardness at positions of the steel sheets 210, 220 near the brazing filler metal 230 (average hardness of positions near brazing filler metal) smaller than the value of the inherent Vicker's hardness of the steel sheets 210, 200 (average hardness of representative positions of base metal region) minus 50 HV. That is, it is possible to lower the hardness of regions near the brazing filler metal 231 of the steel sheets 210, 220 (softened regions). Therefore, it is possible to control the temperature of the steel sheets at the hot stamping step so as to raise the joint strength of the brazed joint. Accordingly, it is possible to produce a high strength brazed joint without greatly changing the conventional process of production of hot stamped parts.

Modification

In the present embodiment, in the heating step, the sheet combination 200 being heated was pressed in the thickness direction of the steel sheets 210, 220. However, as described in the specification of PLT 4, this pressing operation may be performed after the heating step and before the hot stamping step. Further, if performing the above such pressing operation, it is possible to reliably keep a clearance from forming between the steel sheets 210, 220 and the brazing filler metal 231, so this is preferable, but this pressing operation does not necessarily have to be performed.

Further, in the present embodiment, the explanation was given with reference to the example of the case of brazing in the heating step like in the art described in the specification of PLT 4. However, as shown in the art described in the specification of PLT 5, it is also possible to perform the brazing before the heating step.

That is, instead of the first brazing filler metal 231 having a liquidus temperature lower than the heating temperature at the heating step, a second brazing filler metal 232 having a solidus temperature higher than the heating temperature in the hot stamping heating step ("heating step" in the present embodiment) and lower than the solidus temperature of the steel sheets 210, 220 is used to braze the steel sheets 210, 220 (brazing step). The second brazing filler metal 232 is an example of the brazing filler metal 230. It differs from the first brazing filler metal 231 in the liquidus temperature and solidus temperature, but may be the same or different in other properties, shape, etc. Further, regarding the placement of the brazing filler metal 232 in the brazing step or the provision of the softened region, in FIGS. 2 to 4, read the description "brazing filler metal 230" as "brazing filler metal 232".

In the brazing step, the sheet combination 200 set in the fixture is heated so that the temperature of the brazing filler metal 232 becomes a temperature exceeding the liquidus temperature of the brazing filler metal 232 and lower than the solidus temperature of the steel sheets 210, 220. Further, at this time, in the same way as explained while referring to FIG. 3, the sheet combination 200 is preferably heated while applying pressure. The sheet combination 200 heated in this way is cooled until the temperature of the brazing filler metal 232 falls below the solidus temperature of the brazing filler metal 232.

After that, the heating step, hot stamping step, and shot blasting step explained in the present embodiment are performed in that order. Even if heating the brazed sheet combination 200 in the heating step, since the solidus temperature of the brazing filler metal 232 is higher than the heating temperature, the brazing filler metal 232 does not become a liquid phase and the solid phase state can be maintained. Further, in the same way as when using the first brazing filler metal 231, before the start of quenching at the hot stamping step, the Ar3 point of the regions near the brazing filler metal in the steel sheets becomes higher than the Ar3 point of the steel sheets.

Therefore, it is possible to form the above-mentioned softened region at the steel sheets and not only raise the tensile strength of the brazed joint, but also reliably prevent liquid metal embrittlement cracking at the time of hot stamping. Further, the brazing is performed as a separate step from the heating step before the hot stamping, so management of the brazing becomes easy and the brazing conditions can be kept from becoming restricted. Further, even if the atmosphere of the heating step before the hot stamping is a nonreducing atmosphere, it is possible to prevent oxidation of the brazing filler metal from making brazing impossible. Due to the above, it is possible to raise the joint strength of the brazed joint without making major changes in the conventional hot stamping process. The above effect obtained by using such a second brazing filler metal was confirmed by experiments by the present inventors. Further, when performing this, the brazing is completed when starting the heating step, so in the heating step, it is also possible not to apply the above-mentioned pressure.

Further, in the present embodiment, the explanation was given with reference to the example of a case of two steel sheets joined planarly. However, the number of steel sheets joined planarly may be three or more as well. In this case, brazing filler metal is placed between each two facing steel sheets.

Further, the measurement positions of temperature explained in the present embodiment, including the examples and modifications as well, were all positions of the center of the brazing filler metal in the thickness direction of the steel sheets.

Further, the present embodiments, including the examples and modifications, all only show examples of specific means for working the present invention. The technical scope of the present invention must not be limitatively interpreted based on the same. That is, the present invention can be worked in various ways without departing from its technical idea or main features.

The invention claimed is:

1. A method of production of a brazed joint comprising:
a heating step of heating a sheet combination having a plurality of steel sheets superposed so that the sheet surfaces face each other and a first brazing filler metal placed in a predetermined region between the surfaces of two mutually adjoining steel sheets among the plurality of steel sheets by a heating temperature of an Ac3 point of the steel sheets or more, and
a hot stamping step of quenching and shaping the sheet combination heated by the heating step,
wherein the first brazing filler metal has a liquidus temperature of less than the heating temperature,
wherein before the start of quenching in the hot stamping step, the Ar3 point in the region near the brazing filler metal at the steel sheets is higher than the Ar3 point of the steel sheets, and
wherein the quenching start temperature of the sheet combination at the hot stamping step is made a temperature of the Ar3 point of the steel sheet or less.

2. The method of production of a brazed joint according to claim 1, wherein the heating step heats the sheet combination while applying pressure to the sheet combination in the thickness direction of the steel sheets.

3. The method of production of a brazed joint according to claim 2, wherein the plurality of steel sheets are comprised of one or both of nonplated steel sheets not plated on their surfaces and galvanized steel sheets or aluminum plated steel sheets.

4. The method of production of a brazed joint according to claim 1, wherein the plurality of steel sheets are comprised of one or both of nonplated steel sheets not plated on their surfaces and galvanized steel sheets or aluminum plated steel sheets.

5. A method of production of a brazed joint comprising:
a heating step of heating a sheet combination having a plurality of steel sheets superposed so that the sheet surfaces face each other and a second brazing filler metal placed in a predetermined region between the surfaces of two mutually adjoining steel sheets among the plurality of steel sheets by a heating temperature of an Ac3 point of the steel sheets or more, and
a hot stamping step of quenching and shaping the sheet combination heated by the heating step,
wherein the second brazing filler metal has a solidus temperature over the heating temperature in the heating step and less than the solidus temperature of the steel sheets,
wherein before the start of quenching in the hot stamping step, the Ar3 point in the region near the brazing filler metal at the steel sheets is higher than the Ar3 point of the steel sheets, and
wherein the quenching start temperature of the sheet combination at the hot stamping step is made a temperature of the Ar3 point of the steel sheet or less, and
said method further comprising a brazing step of heating the sheet combination to a temperature over a liquidus temperature of the second brazing filler metal and less than the solidus temperature of the steel sheets before the heating step, then cooling down to less than the solidus temperature of the second brazing filler metal to braze the steel sheets.

6. The method of production of a brazed joint according to claim 5, wherein the brazing step heats the sheet combination while applying pressure to the sheet combination in the thickness direction of the steel sheets.

7. The method of production of a brazed joint according to claim 6, wherein the plurality of steel sheets are comprised of one or both of nonplated steel sheets not plated on their surfaces and galvanized steel sheets or aluminum plated steel sheets.

8. The method of production of a brazed joint according to claim 5, wherein the heating step heats the sheet combination while applying pressure to the sheet combination in the thickness direction of the steel sheets.

9. The method of production of a brazed joint according to claim 5, wherein the plurality of steel sheets are comprised of one or both of nonplated steel sheets not plated on their surfaces and galvanized steel sheets or aluminum plated steel sheets.

10. A brazed joint comprising:
a plurality of steel sheets overlaid so that their surfaces face each other, and
a brazing filler metal placed in a predetermined region between the surfaces of two mutually adjoining steel sheets in the plurality of steel sheets,
the two steel sheets being joined by the brazing filler metal,
in which brazed joint, a relationship between an average hardness of positions near the brazing filler metal in the steel sheets contacting the brazing filler metal and an average hardness of representative positions of a base metal region in the steel sheets satisfies the following (A):

Average hardness of positions near brazing filler metal (HV)+50 HV<average hardness of representative positions of base metal region (HV)     (A)

wherein, in (A), the positions near the brazing filler metal are positions separated by exactly 10 μm from the positions of interfaces between the two steel sheets contacting the brazing filler metal and the brazing filler metal to the steel sheet sides along the direction of thickness of the steel sheets, the representative positions of the base metal region are positions at the two steel sheets contacting the brazing filler metal and separated by lengths of exactly ¼ of the thicknesses of the steel sheets from the surfaces of sides of the steel sheets not contacting the brazing filler metal in the two surfaces of the sheets to the steel sheet sides along the direction of thickness of the steel sheets, the average hardness of positions near the brazing filler metal is an arithmetic average of Vicker's hardnesses at three positions near the brazing filler metal, the average hardness of representative positions of the base metal region is an arithmetic average of Vicker's hardnesses at representative positions of the base metal region, and the intervals of the three locations have lengths of 3 times the arithmetic average of the lengths of two diagonals of an indentation first formed for measurement of the Vicker's hardnesses.

11. The brazed joint according to claim 10 wherein a thickness of a softened region of a region of the steel sheets contacting the brazing filler metal and satisfying the following (B) is 10 μm or more:

Hardness of the softened region (HV)+50 HV<average hardness of representative positions of the base metal region (HV)     (B)

where in (B), a hardness of the softened region is a Vicker's hardness at the softened region.

12. The brazed joint according to claim 11 wherein the plurality of steel sheets are comprised of one or both of nonplated steel sheets not plated on their surfaces and galvanized steel sheets or aluminum plated steel sheets.

13. The brazed joint according to claim 10 wherein the plurality of steel sheets are comprised of one or both of nonplated steel sheets not plated on their surfaces and galvanized steel sheets or aluminum plated steel sheets.

* * * * *